(12) United States Patent
Pope et al.

(10) Patent No.: US 12,147,793 B2
(45) Date of Patent: Nov. 19, 2024

(54) SHARDING FOR SYNCHRONOUS PROCESSORS

(71) Applicant: Google LLC, Mountain View, CA (US)

(72) Inventors: Reiner Pope, Mountain View, CA (US); Herman Schmit, Palo Alto, CA (US); Michial Allen Gunter, Oakland, CA (US)

(73) Assignee: Google LLC, Mountain View, CA (US)

( * ) Notice: Subject to any disclaimer, the term of this patent is extended or adjusted under 35 U.S.C. 154(b) by 202 days.

(21) Appl. No.: 17/636,805

(22) PCT Filed: Aug. 20, 2020

(86) PCT No.: PCT/US2020/047206
§ 371 (c)(1),
(2) Date: Feb. 18, 2022

(87) PCT Pub. No.: WO2021/035055
PCT Pub. Date: Feb. 25, 2021

(65) Prior Publication Data
US 2022/0300450 A1    Sep. 22, 2022

Related U.S. Application Data

(60) Provisional application No. 62/890,471, filed on Aug. 22, 2019.

(51) Int. Cl.
*G06F 8/41* (2018.01)
*G06F 9/48* (2006.01)
(Continued)

(52) U.S. Cl.
CPC ............ *G06F 8/451* (2013.01); *G06F 8/4451* (2013.01); *G06F 9/4881* (2013.01);
(Continued)

(58) Field of Classification Search
None
See application file for complete search history.

(56) References Cited

U.S. PATENT DOCUMENTS

| | | |
|---|---|---|
| 5,682,107 A | 10/1997 | Tavana et al. |
| 9,542,442 B2 | 1/2017 | Meiyyappan et al. |
| | (Continued) | |

FOREIGN PATENT DOCUMENTS

| | | |
|---|---|---|
| CN | 103262038 | 9/2017 |
| CN | 207731321 | 8/2018 |
| | (Continued) | |

OTHER PUBLICATIONS

Office Action in Japanese Appln. No. 2022-511309, dated Apr. 24, 2023, 9 pages (with English translation).

(Continued)

*Primary Examiner* — Qing Chen
(74) *Attorney, Agent, or Firm* — Fish & Richardson P.C.

(57) ABSTRACT

Methods, systems, and apparatus, including computer programs encoded on computer storage media, for sharding dataflow graphs for a device having multiple synchronous tiles. One of the methods includes receiving a representation of a dataflow graph comprising a plurality of nodes that each represent respective matrix operations to be performed by a device having a plurality synchronous tiles. Candidate allocations of respective portions of the dataflow graph to each tile of the plurality of synchronous tiles are evaluated according to one or more resource constraints of the device. One of the candidate allocations is selected based on evaluating each candidate allocation.

20 Claims, 11 Drawing Sheets

(51) Int. Cl.
*G06F 9/50* (2006.01)
*G06F 15/82* (2006.01)
*G06F 17/16* (2006.01)

(52) U.S. Cl.
CPC .......... *G06F 9/5066* (2013.01); *G06F 15/825* (2013.01); *G06F 17/16* (2013.01); *G06F 2209/483* (2013.01); *G06F 2209/485* (2013.01); *G06F 2209/5017* (2013.01); *G06F 2209/506* (2013.01)

(56) References Cited

U.S. PATENT DOCUMENTS

| | | |
|---|---|---|
| 9,760,486 B2 | 9/2017 | Solihin |
| 9,785,403 B2 | 10/2017 | Goyal et al. |
| 2012/0079498 A1 | 3/2012 | Kim et al. |
| 2018/0300181 A1* | 10/2018 | Hetzel ................... G06F 9/5055 |
| 2019/0102338 A1* | 4/2019 | Tang ........................ G06F 9/38 |
| 2019/0239085 A1 | 8/2019 | O'Shea |

FOREIGN PATENT DOCUMENTS

| | | |
|---|---|---|
| CN | 105630441 | 12/2018 |
| JP | 2009-151645 | 7/2009 |
| JP | 4651891 B2 | 3/2011 |
| JP | 2012-248114 | 12/2012 |
| TW | I353521 | 12/2011 |
| WO | WO 2018185765 | 10/2018 |
| WO | WO 2018193370 | 10/2018 |

OTHER PUBLICATIONS

Besta et al., "Graph Processing on FPGAs: Taxonomy, Survey, Challenges," CoRR, Feb. 25, 2019, arxiv.org/abs/1903.06697, 31 pages.
Dai et al., "ForeGraph : Exploring Large-scale Graph Processing on Multi-FPGA Architecture," FPGA '17: Proceedings of the 2017 ACM/SIGDA International Symposium on Field-Programmable Gate Arrays, Jan. 1, 2017, pp. 217-226.
Gui et al., "Survey on Graph Processing Accelerators: Challenges and Opportunities," Journal of Computer Science and Technology, Jan. 2019, 41 pages.
International Preliminary Report on Patentability in International Appln. No. PCT/US2020/047206, dated Feb. 17, 2022, 11 pages.
International Search Report and Written Opinion in International Appln. No. PCT/US2020/047206, dated Dec. 17, 2020, 15 pages.
Office Action in Taiwan Appln. No. 109128609, dated Sep. 29, 2021, 14 pages (with English translation).
Wang et al., "Automated Generation of High-Performance Large-Scale Matrix Multiplication Accelerator on FPGA," Department of Computer Science, University of California, Nov. 5, 2016, 8 pages.
Office Action in European Appln. No. 20771947.7, mailed on Mar. 26, 2024, 12 pages.
Notice of Allowance in Japanese Appln. No. 2022-511309, mailed on Dec. 18, 2023, 5 pages (with English translation).

* cited by examiner

Sublayer Sharding

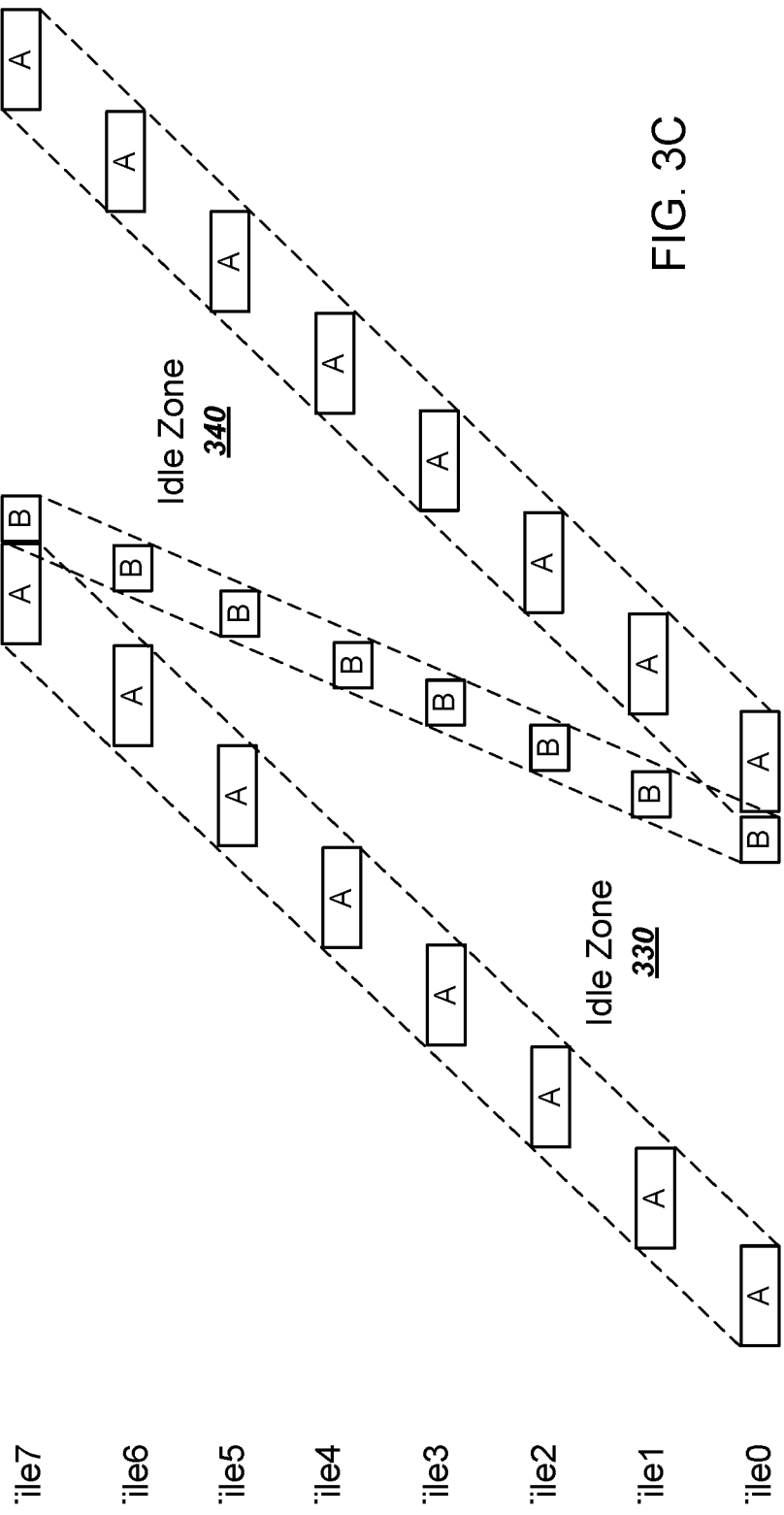

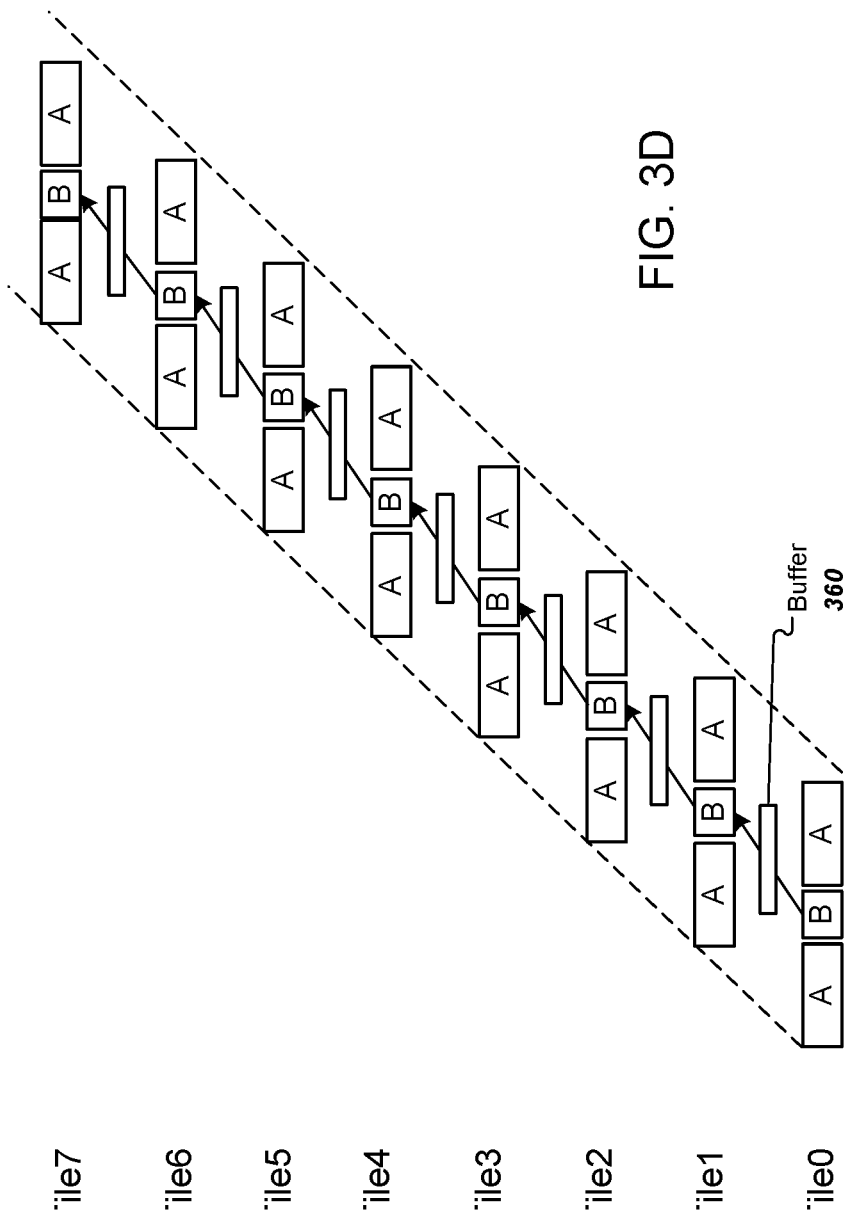

SHARDING FOR SYNCHRONOUS PROCESSORS

CROSS-REFERENCE TO RELATED APPLICATIONS

This application is a National Stage Application under 35 U.S.C. § 371 and claims the benefit of International Application No. PCT/US2020/047206, filed Aug. 20, 2020, which claims priority to U.S. Application No. 62/890,471, filed Aug. 22, 2019, entitled SHARDING FOR SYNCHRONOUS PROCESSORS. The disclosures of the foregoing applications are incorporated herein by reference in their entirety.

BACKGROUND

This specification relates to compiler techniques for integrated circuit accelerators. A synchronous integrated circuit accelerator is an application-specific integrated circuit (ASIC) that is designed for performing highly parallel synchronous operations. The parallelism is achieved by integrating many different independent processing elements that can execute concurrently.

Such devices are well-suited for accelerating inference passes through neural networks, e.g., with each of the independent processing elements performing a different multiplication or addition of layer inputs with weights. Neural networks are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

An accelerator can use multiple independent processing tiles. In this specification, a tile refers to any appropriate device having a computational array of cells that can perform computations on a portion of a matrix at least partially in parallel. Each cell thus includes circuitry that allows the cell to perform mathematical or other computations. In a typical scenario, a tile receives an input vector, uses the computational array to multiply the input vector by a matrix of weights, and generates an output vector.

In this specification, a tile being synchronous means that the operations performed by the computational array do not perform branched execution, e.g., as in an if/else statement of an imperative program. Rather, the operations can be scheduled in advance either partially or fully. For example, the operations of some synchronous processors can be scheduled down to the individual cycle level, meaning that every operation of every processing element the computational array is assigned to a particular slot in a sequence of execution cycles.

SUMMARY

This specification describes techniques for compiling programs written for systems having multiple synchronous processors. As described above, for brevity such devices will be referred to in this specification as tiles.

A compiler can take advantage of the cycle-level precision at which the operations of a program executing over multiple synchronous processors can be scheduled. This allows for fine-grained sharding of the operations, as well as other performance enhancements. The techniques described in this specification are particularly useful for scheduling operations in a system that operates multiple tiles in a linear array in which each tile communicates with only its neighboring tiles in the linear array. However, the same techniques can also be used in systems that lack this hardware arrangement.

Particular embodiments of the subject matter described in this specification can be implemented so as to realize one or more of the following advantages. A compiler can utilize various sharding techniques to increase the performance of a device having multiple compute tiles. The execution of a task on such a device can be adapted to device specifications/constraints using the sharding techniques. The compiler can use sublayer sharding in order to increase the utilization of the device. The compiler can also use parallelogram time slicing to reduce or eliminate idle zones in which the tiles perform no work because they are waiting for something to happen. A compiler can also use oversharding to improve the load balancing among the tiles and to handle load balancing situations that are unpredictable at compile time. A compiler can also use zigzag sharding to balance the memory and computational requirements among the tiles.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3A-3D illustrate examples of parallelogram time slicing.

Like reference numbers and designations in the various drawings indicate like elements.

DETAILED DESCRIPTION

Figure 1:
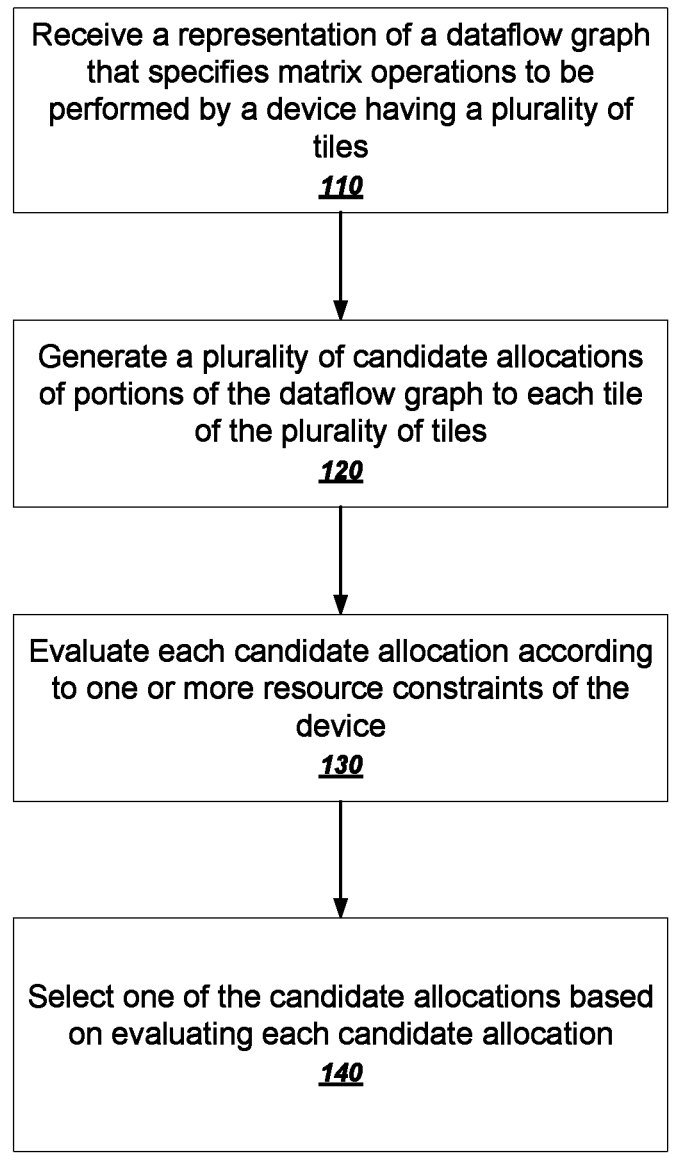
FIG. 1 is a flowchart of an example process for sharding matrix operations for a device having multiple tiles.

FIG. 1 is a flowchart of an example process for sharding matrix operations for a device having multiple tiles. As described above, the target device can have tiles arranged in a linear array or configured to operate as a linear array in which each tile communicates only with its neighboring tiles. Thus, in response to receiving a dataflow graph, the system can generate an allocation between nodes of the graph and tiles that takes into consideration the ordering of tiles in the linear array. For convenience, the example process will be described as being performed by a system of one or more computers, located in one or more locations, and programmed appropriately in accordance with this specification.

The system receives a representation of a dataflow graph that specifies matrix operations to be performed by a device having a plurality of tiles (110). In this context, matrix operations should be understood to include matrix or vector operations. Each node of the dataflow graph specifies matrix operations to be performed on a matrix that is dedicated to that node. For example, each node in the graph can represent a layer of a neural network, with the matrix storing the weights to be used and to be learned for that layer. Each edge of the graph represents a propagation of data in which the output of one node becomes input to a next node. The system generates a plurality of candidate allocations of portions of the dataflow graph to each tile of the plurality of tiles (120). The problem of sharding can be formulated as a search problem to find a best allocation of portions of the dataflow graph to tiles on the device from among a plurality of candidate allocations. A variety of techniques are described in more detail below that relate to generating candidates to be evaluated. Which candidate allocations are actually the best is highly dependent on the dataflow graph and the particular application.

The system evaluates each candidate allocation according to one or more resource constraints of the device (130). Important resource constraints include memory constraints and bandwidth constraints.

One example memory constraint for a machine learning accelerator is that all weights of all matrices assigned to a particular tile have to fit within static random-access memory (SRAM) that is local to the tile. In other words, each tile can have an integrated amount of resident SRAM, which becomes a memory constraint when performing sharding. The reason for this constraint involves speed and bandwidth. First, a machine learning accelerator is designed to perform an inference pass through a model as fast as possible. And for some applications, dynamic random-access memory (DRAM) is insufficiently fast. In addition, the weights for the matrices can be large and therefore difficult to move around. Therefore, when all the weights of all matrices assigned to a particular tile can fit within the local SRAM of the tile, the tile need not spend time reading and writing the weights during the inference passes or during training updates.

Another example memory constraint is a bandwidth constraint. The bandwidth constraint specifies how quickly data must move between nodes of the graph. If the proposed allocation would exceed a bandwidth threshold for a particular edge in the graph, the system can determine that the bandwidth constraint has been violated.

The system selects one of the candidate allocations based on evaluation each candidate allocation (140). As one example, the system can perform layer sharding in which different matrices from different layers of an input program are allocated to different respective tiles. Thus, for example, a neural network having 8 layers can have its weight matrices allocated to 8 tiles respectively.

For candidate allocations that satisfy the one or more resource constraints, the system can determine which allocation best optimizes the utilization of the tiles on the device. In general, this involves computing the maximum amount of compute time over all tiles, and then selecting the candidate allocation that has the minimum maximum amount of compute time. For a device having synchronous tiles, which can be scheduled in advance down to the cycle level, these calculations can be far more accurate than compiler estimates for other kinds of devices.

After selecting the candidate allocation, the system can perform further lowering of the dataflow graph program by generating hardware instructions that will be executed by the tiles of the device. The system can then load the hardware instructions onto the device, along with the weights of the matrices, and execute the hardware instructions on the device in order to effectuate the operations represented by the dataflow graph.

Figure 2A:
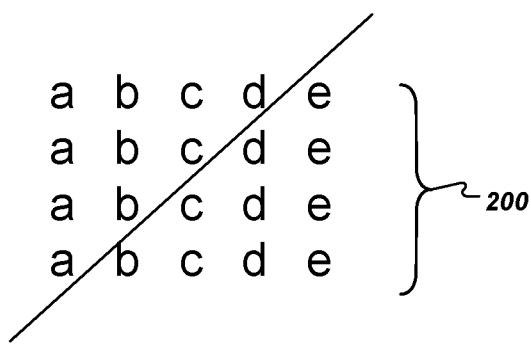
FIGS. 2A-2B illustrate examples of sublayer sharding.
Figure 2B:
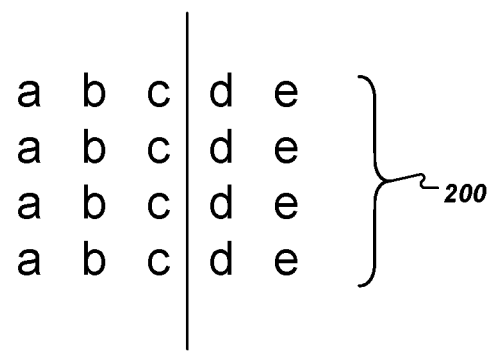

FIGS. 2A-2B illustrate examples of sublayer sharding. Sublayer sharding refers to splitting up one matrix of a particular node in the dataflow graph and assigning different portions to different tiles. FIG. 2A illustrates one example candidate split, in which the elements of the matrix 200 are split along a diagonal. FIG. 2B illustrates another example candidate split, in which the elements of the matrix 200 are split between columns. Alternatively or in addition, the matrix 200 can be split between rows. In some implementations, the system generates a candidate allocation using sublayer sharding whenever a matrix exceeds a size threshold.

In order to generate a candidate allocation for sublayer sharding, some additional complexity is required to be added to the dataflow graph. In particular, the vector inputs for each layer often have to be broadcast to every tile that receives a portion of the sublayer sharding results. In addition, the partial sums or activations generated by the individual tiles have to be merged into a final sum or activation at a later stage, either on a same or on a different tile. The compiler can take these additional complexities into account when evaluating a candidate allocation that involves sublayer sharding.

Figure 3A:
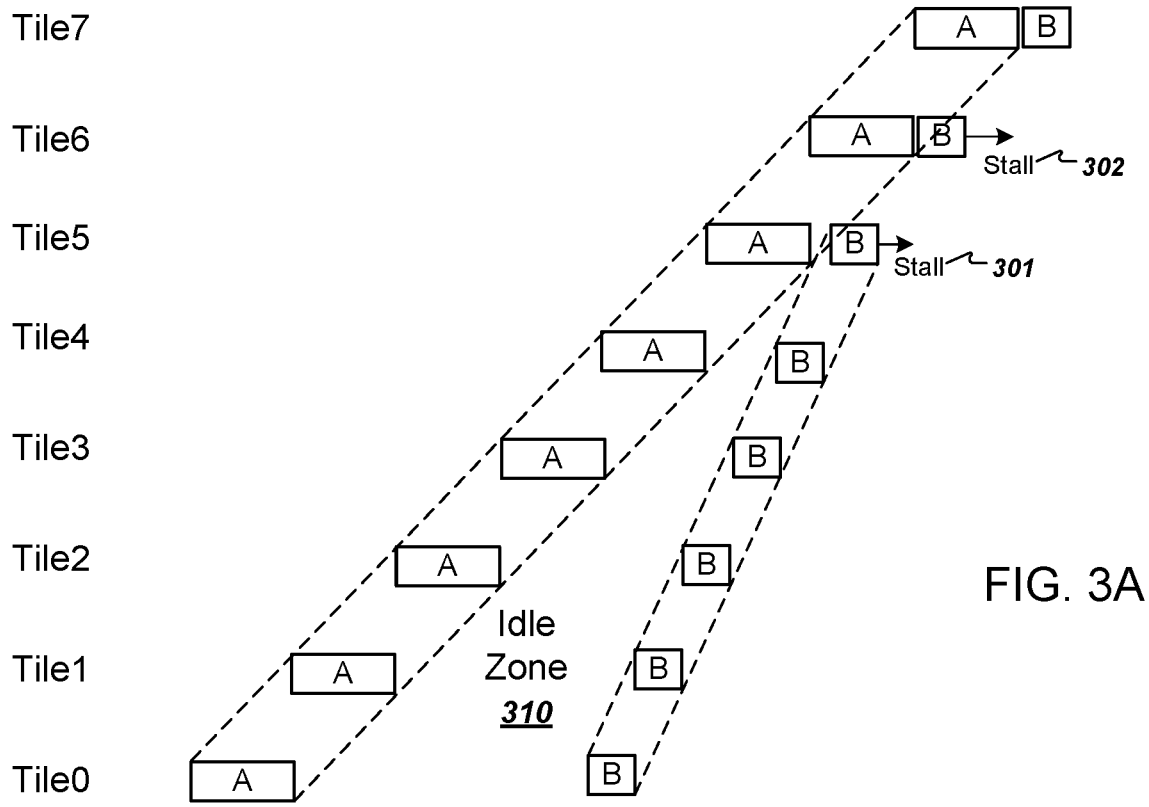
Figure 3B:
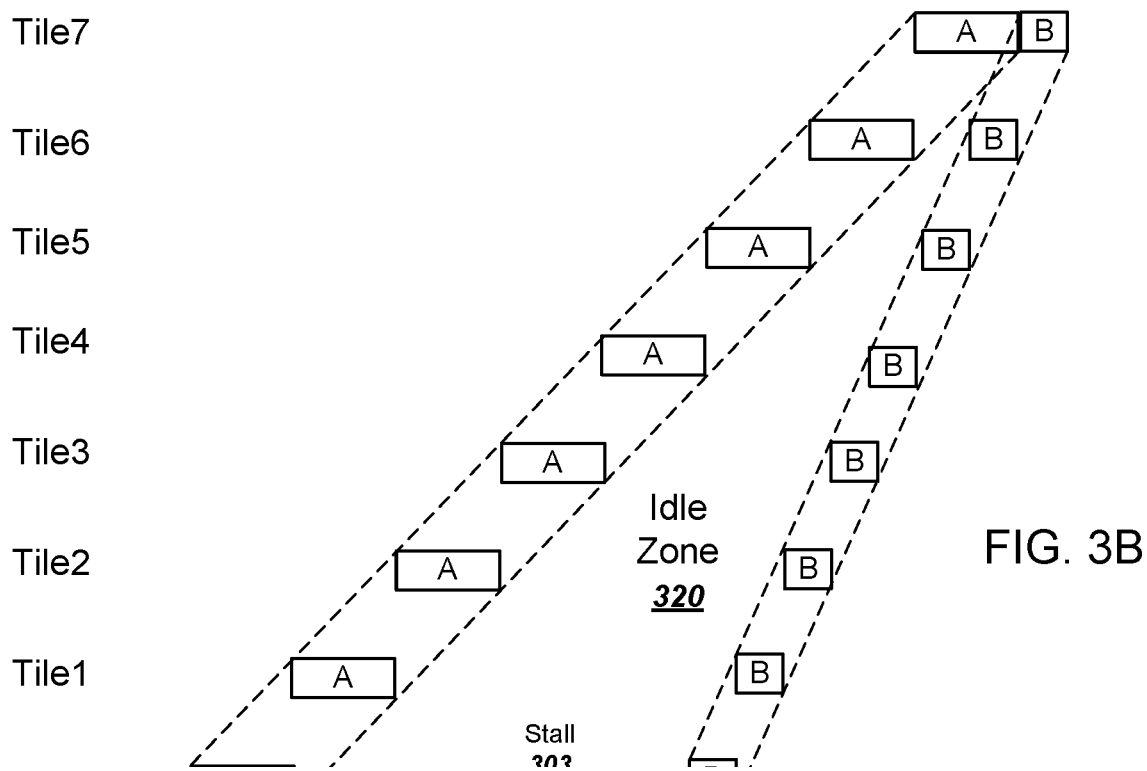

FIGS. 3A-3C illustrate examples of parallelogram time slicing. Parallelogram time slicing can be advantageous when the tiles execute certain operations in different passes that have different execution slopes. The execution slope refers to how quickly the tiles can fully perform all operations in the sequence. Such applications are common for neural networks, for example, where a single pass through all tiles can represent one inference pass through the network.

FIG. 3A illustrates the conflict that arises from different execution slopes. In FIG. 3A, the horizontal axis represents time. The tiles in FIG. 3A are arranged in a linear array structure such that each tile can provide data only to its two immediate neighbors and can receive data only from its two immediate neighbors. In some implementations, the linear array structure wraps around, e.g., as a ring structure, so that the last tile can communicate with the first tile and vice versa.

Thus, the tiles first sequentially perform Pass A, starting with Tile0 up through Tile7. Pass A has the common property of machine learning models in that each tile cannot start execution until receiving an output from the previous tile. Thus, Tile1 has to wait on Tile0 to finish, Tile2 has to wait for Tile1 to finish, and so on. The dashed lines in FIG. 3A illustrate how this common pattern forms a parallelogram for Pass A.

FIG. 3A also illustrates a second pass, Pass B. The operations of Pass B do not take as much time as Pass A, and therefore, Pass B has a steeper execution slope than Pass A.

In this example, the different execution slopes of Pass A and Pass B cause a collision between Tile5 and Tile6. The collision occurs because by the time Tile5 finishes Pass B, Tile6 has not yet finished its portion of Pass A. Therefore, stalls 301 and 302 must be introduced, either by the compiler or a run time, which causes Tile5 to wait to provide the results for Pass B until Tile6 has finished the operations of Pass A.

FIG. 3B illustrates an alternative strategy to manage the different execution slopes, which is to introduce a single stall 303 before Pass B even starts so that the last operations of Pass B on Tile7 can be executed immediately after the last operations of Pass A.

Both of these strategies results in idle zones 310 and 320 in which tiles sit idle without doing any work. The idle zone 310 is smaller than the idle zone 320, although introducing multiple stalls introduces additional compile-time or run-time control complexity that the strategy in FIG. 3B lacks.

FIG. 3C illustrates how differing execution slopes can actually introduces additional idle zones. In FIG. 3C, Pass B having a steeper execution slope results in a first idle zone 330. But if Pass A were to be executed again after Pass B, this introduces a second idle zone 340.

FIG. 3D illustrates how to use parallelogram time slicing to manage different execution slopes. In order to reduce the idle zones introduced by different execution slopes, the compiler can generate a schedule that forces all passes to effectively have the same execution slope. The different passes thus effectively fit together to eliminate the idle zones.

The compiler can force a shallower execution slope using stalls or buffering. For example, as shown in FIG. 3D, the execution slope of Pass B has been lowered by introducing buffering between the different tiles. In other words, after Tile® has completed Pass B, the result is stored in a buffer 360. Tile® can then immediately begin processing the second iteration of Pass A. Alternatively or in addition, the compiler can insert a stall between the end of Pass B and the start of the second iteration of Pass A. Note that although this solution introduces more stalls than the approach shown in FIG. 3A, the overall idle zones are substantially smaller.

Forcing a shallowing execution slope introduces additional control complexity that the compiler can take into account when evaluating the candidate allocations. In particular, the forced shallowing execution slope introduces a timing constraint for certain passes. For example, in FIG. 3D, the timing constraint is that Pass B on Tile1 cannot begin immediately after Pass B on Tile0.

Figure 4A:
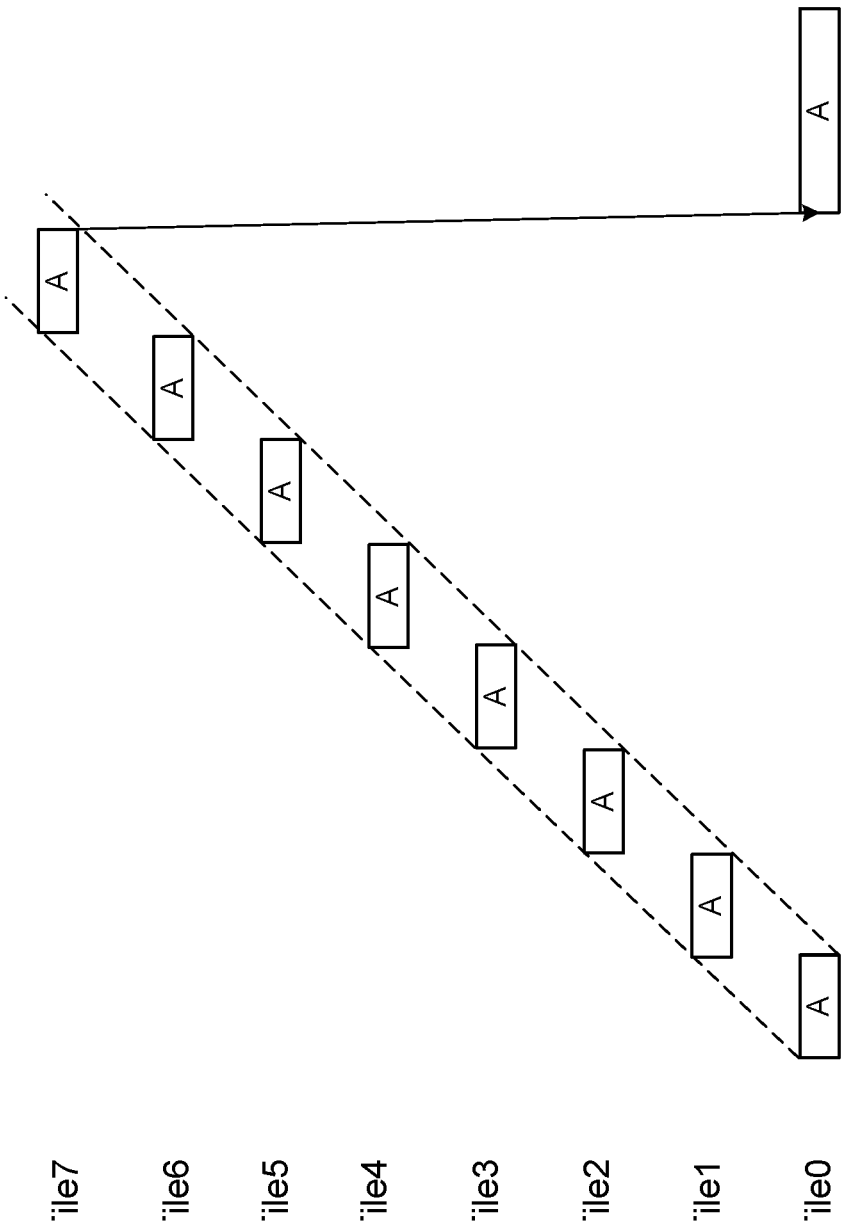
FIGS. 4A-C illustrate examples of oversharding.
Figure 4B:
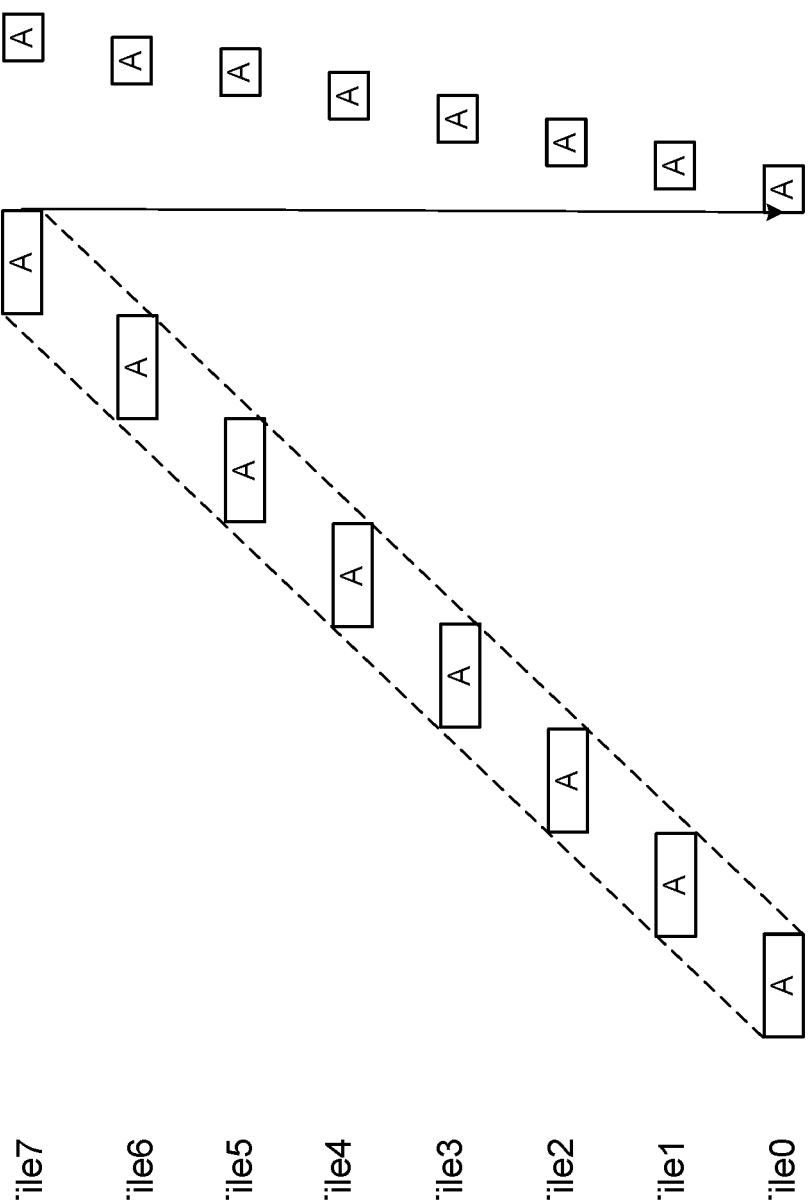
Figure 4C:
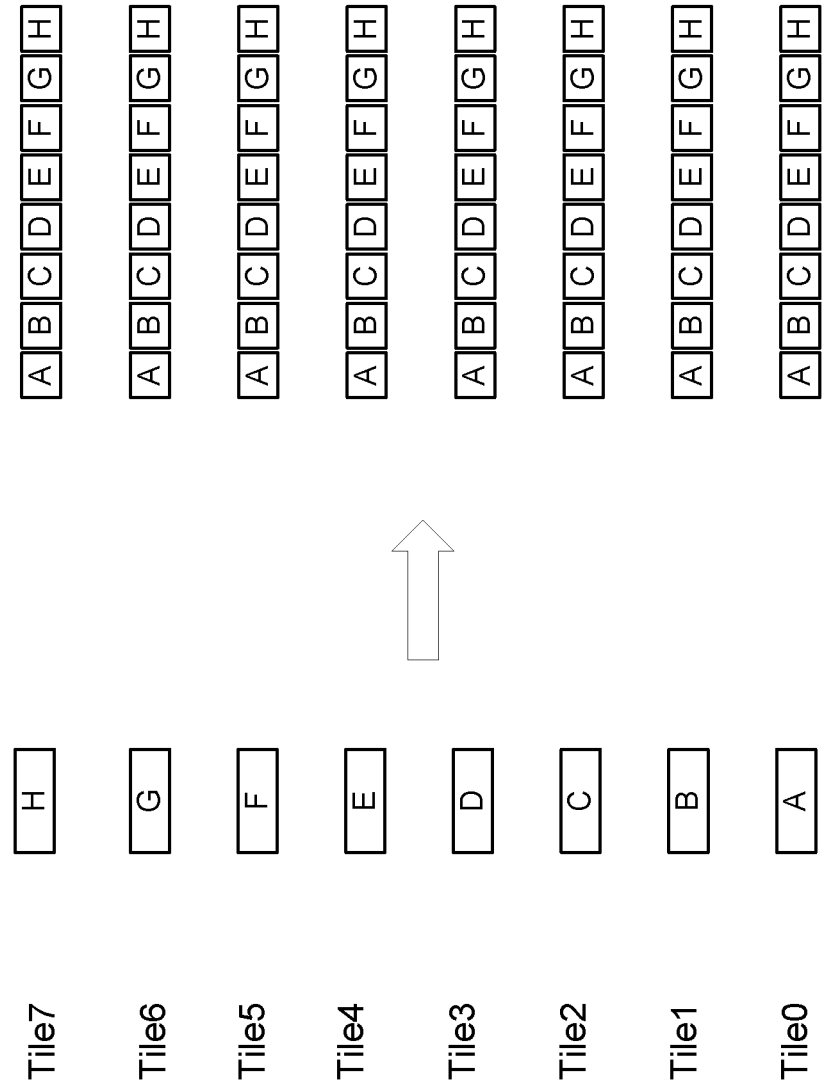

FIGS. 4A-C illustrate examples of oversharding. Oversharding refers to techniques for sharding a matrix more finely than is required by the hardware. In other words, the computations could be performed by a single tile, but the matrix is sharded anyway for other reasons. Often, those other reasons relate to load balancing.

FIG. 4A illustrates performing a single Pass A having 9 layers over 8 tiles. Thus, the $9^{th}$ layer in this example is allocated completely to Tile0. Although Tile0 has the availability and memory capacity to completely perform all operations of the 9th layer, this leaves the rest of the tiles completely unoccupied during this time.

FIG. 4B illustrates oversharding of the $9^{th}$ layer of Pass A. In other words, even though a single tile could perform all the operations of the $9^{th}$ layer, the $9^{th}$ layer is oversharded to distribute it across all 8 of the other tiles. There may or may not be a intralayer data dependency, and therefore, the different portions of the $9^{th}$ layer can be executed partially or fully in parallel.

Therefore, the device has better load balancing than if only one tile were performing the $9^{th}$ layer. This can be especially advantageous when the device is also performing other computations as well.

FIG. 4C illustrates another application of oversharding to handle runtime load balancing. For some applications, the runtime loads on the tiles is not known in advance. One such example is that the device could be used to provide automatic machine translations using a number of different models trained for different translations. For example, as shown on the left in FIG. 4C, Tile0 can be assigned to execute Model A, Tile1 can be assigned to execute Model B, and so on. However, the actual order in which these models is used is not known at compile time, particularly if the device is used in a back-end server that services incoming Internet traffic.

Therefore, it could be the case that Tile® handles the vast majority of requests, and the other tiles are used only rarely.

In order to provide some runtime load balancing, the compiler can overshard the models and distribute all the models over all the chips, as shown in the right side of FIG. 4C.

Now, at runtime, all the tiles can have substantially equal utilization, regardless of the actual distribution of runtime loads.

Figures 5A, 5B:
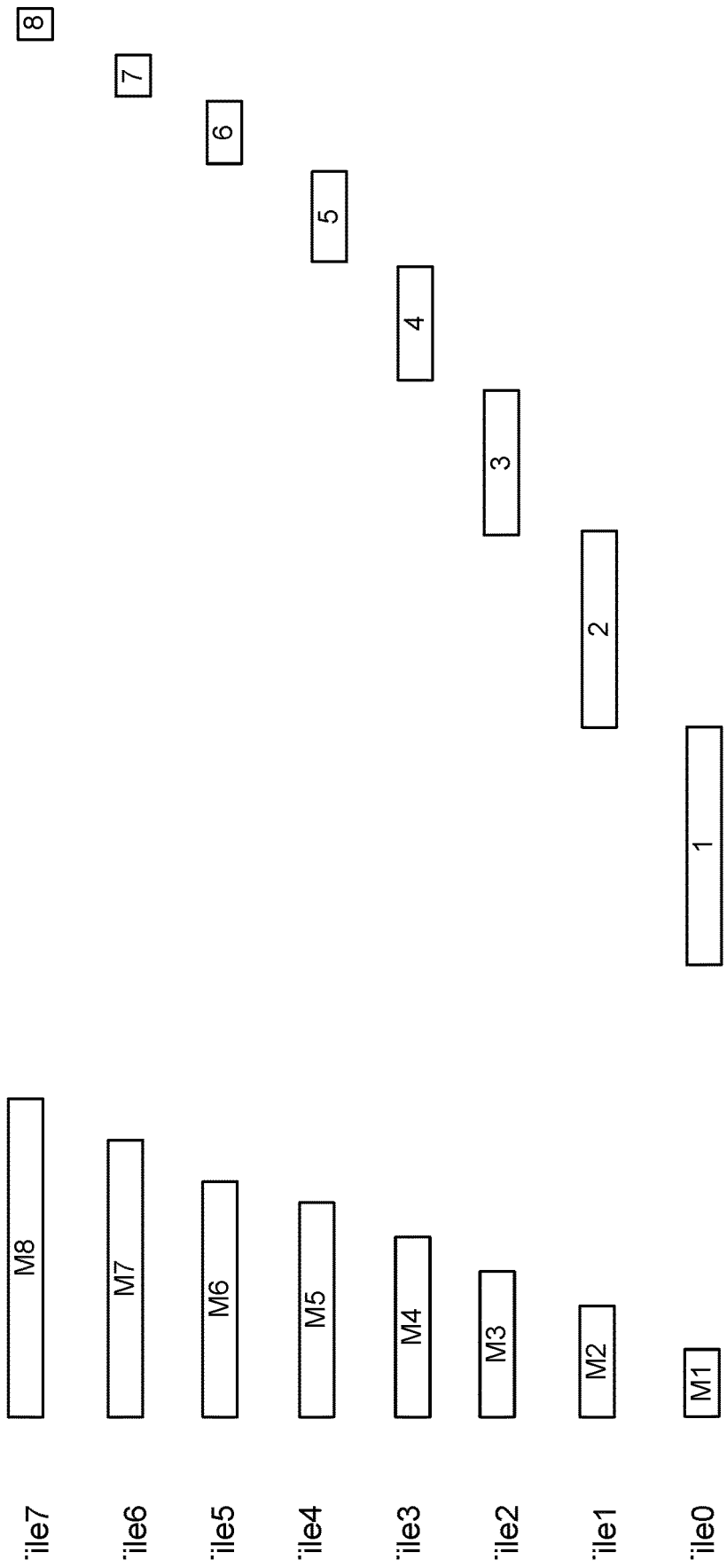
FIGS. 5A-5C illustrate examples of another version of oversharding referred to as zigzag sharding.
Figure 5C:
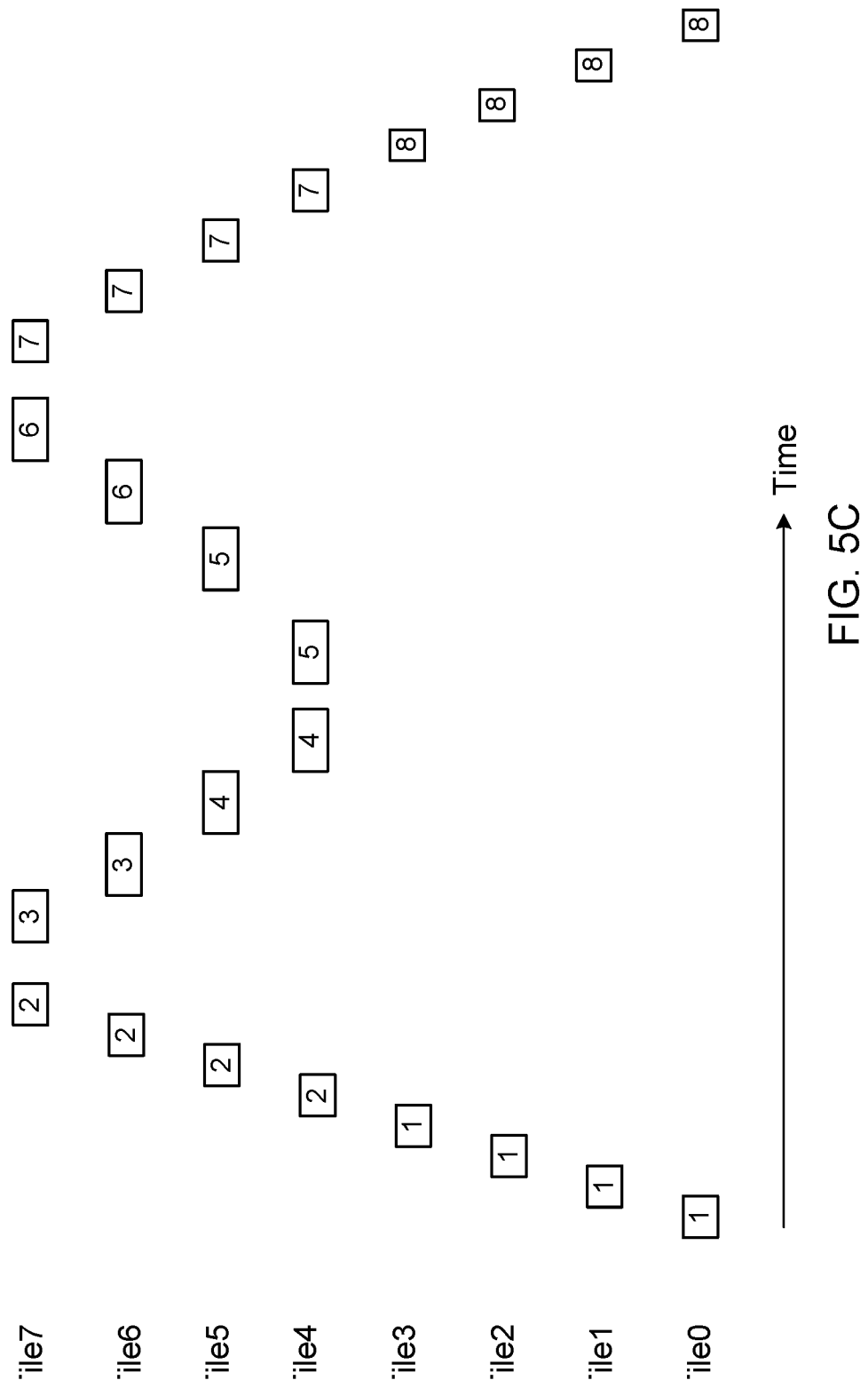

FIGS. 5A-5C illustrate examples of another version of oversharding referred to as zigzag sharding. For many machine learning applications, including neural networks, a common pattern emerges: layers have decreasing compute complexity but increasing memory requirements.

Thus, as shown in FIG. 5A, the memory pattern can result in each subsequent tile requiring more and more memory. And as shown in FIG. 5B, the computational pattern requires fewer and fewer computational resources.

A compiler can use zigzag sharding so that all tiles have more balanced memory and computational assignments. Zigzag sharding essentially pairs different complementary layers together so that they are executed by the same tile. Thus, for example, zigzag sharding can ensure that the same tile will execute the first layer and the eighth layer, the second layer and the seventh layer, the third layer and the sixth layer, and the fourth layer and the fifth layer. This allocation is shown in FIG. 5C, in which the computational pattern takes a zigzag shape.

As shown in FIG. 5C, the first layer, layer 1, is oversharded and distributed among tiles 0-3 to split up the computational complexity of the first layer. In a similar but complementary fashion, the eighth layer is also split up and distributed among the same tiles 0-3 to split up the memory requirements of the eighth layer.

Likewise, the second layer is always assigned to the same tile as seventh layer, the third layer is always assigned to the same tile as the sixth layer, and the fourth layer is always assigned to the same tile as the fifth layer.

Each of the examples of sharding techniques described above in relation to FIGS. 2-4 may each be used either alone or in combination with any one or more of the other sharding techniques.

Figure 6:
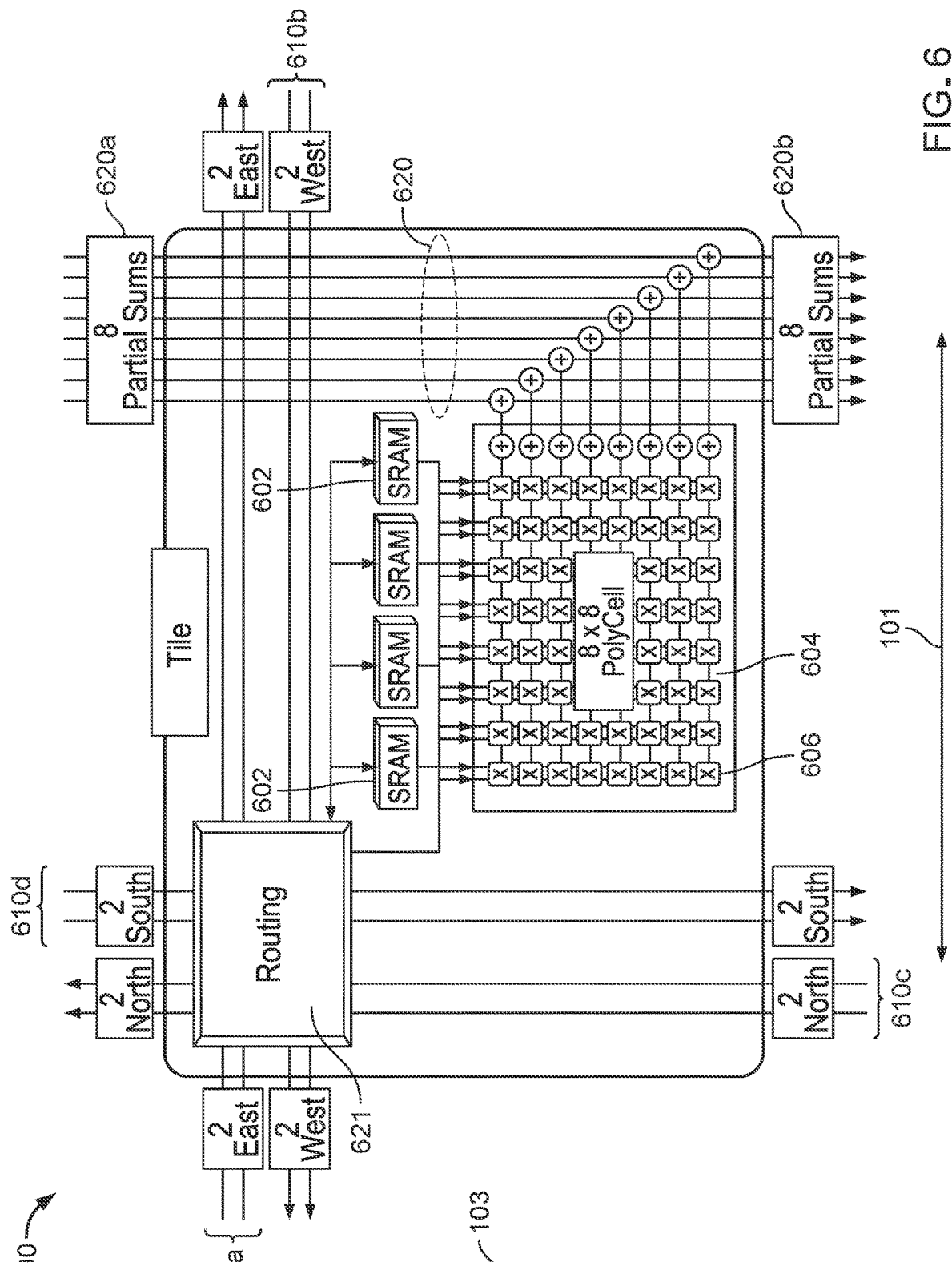
FIG. 6 illustrates an example of a tile that can be used to implement processing in a system having multiple synchronous processors.

FIG. 6 illustrates an example of a tile 600 that can be used to implement processing in a system having multiple synchronous processors. For example, the tile 600 can be used as one tile in a linear array of tiles or in a system in which the tiles operate as a linear array of tiles.

Each tile 600 includes local memory 602 and a computational array 604 coupled to the memory 602. The local memory 602 includes physical memory positioned proximate to the computational array 604. The computational array 604 includes multiple cells 606. Each cell 606 of the computational array 604 includes circuitry configured to perform a computation (e.g., a multiply and accumulate operation) based on data inputs, such as activation inputs and weight inputs, to the cell 606. Each cell can perform the computation (e.g., the multiply and accumulation operation) on a cycle of the clock signal. The computational array 604 can have more rows than columns, more columns than rows, or an equal number of columns and rows. For instance, in the example shown in FIG. 6, the computational array 604 includes 64 cells arranged in 8 rows and 8 columns. Other computational array sizes are also possible, such as computational arrays having 16 cells, 32 cells, 128 cells, or 256 cells, among others. Each tile can include the same number of cells and/or the same size computational array.

The memory 602 contained in the tile 600 can include, e.g., random-access memory (RAM), such as SRAM. Each memory 602 can be configured to store $(1/n)^{th}$ of the total memory associated with n tiles 502 of a system having multiple tiles. The memory 602 can provided as a single chip or in multiple chips. For example, memory 602 shown in FIG. 6 is provided as four single-port SRAMs, each of which is coupled to the computational array 604. Alternatively, the memory 602 can be provided as two single-port SRAMs or eight single-port SRAMS, among other configurations. The joint capacity of the memory can be, but is not limited to, e.g., 16 kB, 32 kB, 64 kB, or 128 kB, after error correction coding. By providing the physical memory 602 locally to the computational arrays, the density of wiring can be vastly reduced.

The tile 600 also includes controllable bus lines. The controllable bus lines may be categorized into multiple different groups. For example, the controllable bus lines can include a first group of general purpose controllable bus lines 610 configured to transfer data among tiles in each cardinal direction. That is, the first group of controllable bus lines 610 can include: bus lines 610a configured to transfer data toward a first direction along the first dimension 501 of the grid of tiles (referred to as "East" in FIG. 6); bus lines 610b configured to transfer data toward a second direction along the first dimension 101 of the grid of tiles (referred to as "West" in FIG. 6), in which the second direction is opposite to that of the first direction; bus lines 610c configured to transfer data toward a third direction along the second dimension 103 of the grid of tiles (referred to as "North" in FIG. 6); and bus lines 610d configured to transfer data toward a fourth direction along the second dimension 103 of the grid of tiles (referred to as "South" in FIG. 6), in which the fourth direction is opposite to the third direction. General purpose bus lines 610 can be configured to carry control data, activation input data, data from and/or to the communications interface, data from and/or to the vector processing unit, and data to be stored and/or used by the tile 600 (e.g., weight inputs). The tile 600 may include one or more control elements 621 (e.g., flip-flops and multiplexers) for controlling the controllable bus lines, and thus routing data to and/or from the tile 600 and/or from memory 602.

The controllable bus lines also can include a second group of controllable bus lines, referred to herein as computational array partial sum bus lines 620. The computational array partial sum bus lines 620 can be configured to carry data output from computations performed by the computational array 604. For example, the bus lines 620 can be configured to carry partial sum data obtained from the rows in the computational array 604, as shown in FIG. 6. In such case, the number of bus lines 620 would match the number of rows in the array 604. For instance, for a 8×8 computational array, there would be 8 partial sum bus lines 620, each of which is coupled to the output of a corresponding row in the computational array 604. The computational array output bus lines 620 can be further configured to couple to another tile within the system, e.g., as inputs to a computational array of a neighboring tile in a linear array of tiles. For example, the array partial sum bus lines 620 of tile 600 can be configured to receive inputs (e.g., partial sums 620a) of a computational array of a second tile that is located at least one tile away from the tile 600. The outputs of computational array 604 then are added to the partial sum lines 620 to produce new partial sums 620b, which may be output from the tile 600. The partial sums 620b then may be passed to another tile or, alternatively, to a vector processing unit. For example, each bus line 620 may be coupled to a corresponding segment (such as segments 506 in FIG. 5) of the vector processing unit.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
receiving a representation of a dataflow graph comprising a plurality of nodes that each represent respective matrix operations to be performed by a device having a plurality synchronous tiles;
generating a plurality of candidate allocations of respective portions of the dataflow graph to each tile of the plurality of synchronous tiles;
evaluating each candidate allocation of the plurality of candidate allocations according to one or more resource constraints of the device; and
selecting one of the candidate allocations based on evaluating each candidate allocation.

Embodiment 2 is the method of embodiment 1, wherein each tile of the plurality of synchronous tiles comprises a computational array of independent processing elements.

Embodiment 3 is the method of any one of embodiments 1-2, wherein generating the plurality of candidate allocations according to one or more resource constraints comprises generating the candidate allocations according to an SRAM memory constraint, which specifies that all weights of the associated operations must fit within a local SRAM that is local to the corresponding synchronous tile.

Embodiment 4 is the method of embodiment 3, wherein each local SRAM is resident memory integrated into the same synchronous tile that will perform the operations.

Embodiment 5 is the method of any one of embodiments 1-4, wherein generating the plurality of candidate allocations comprises allocating matrices of different respective layers to different respective tiles.

Embodiment 6 is the method of any one of embodiments 1-5, wherein generating the plurality of candidate allocations comprises performing sublayer sharding on a matrix for a particular node in the program, including allocating different blocks of the matrix to different respective synchronous tiles.

Embodiment 7 is the method of embodiment 6, wherein allocating different blocks of the matrix to different respective synchronous tiles comprises splitting the matrix along a row or column or splitting the matrix diagonally.

Embodiment 8 is the method of embodiment 7, wherein the operations further comprise performing sublayer sharding on any matrix that exceeds a size threshold.

Embodiment 9 is the method of any one of embodiments 1-8, wherein generating the plurality of candidate allocations comprises performing parallelogram time slicing so that different passes having initially different execution slopes have a substantially similar execution slope.

Embodiment 10 is the method of embodiment 9, wherein performing parallelogram time slicing comprises:
  computing a respective execution slope for each of two different passes;
  determining that a first pass has a smaller execution slope than a second pass; and
  in response, modifying the candidate allocation so that the first pass has a shallower execution slope.

Embodiment 11 is the method of embodiment 10, wherein modifying the candidate allocation comprises inserting buffering or stalls into the candidate allocation.

Embodiment 12 is the method of any one of embodiments 1-11, wherein generating the plurality of candidate allocations comprises performing oversharding so that a node of the dataflow graph that could be performed entirely by one of the tiles is split among multiple different tiles.

Embodiment 13 is the method of embodiment 12, wherein performing oversharding comprises assigning one respective layer to each tile and splitting a last layer among all the tiles.

Embodiment 14 is the method of embodiment 12, wherein performing oversharding comprises splitting a plurality of matrices across all the tiles.

Embodiment 15 is the method of any one of embodiments 1-14, wherein generating the plurality of candidate allocations comprises performing zigzag sharding by pairing together different layers having differing memory and computational requirements.

Embodiment 16 is the method of embodiment 15, wherein pairing together different layers comprises pairing a first layer with a last layer so that a same tile executes both the first layer and the last layer.

Embodiment 17 is the method of embodiment 16, wherein the first layer has the greatest computational requirements and the last layer has the greatest memory requirements.

Embodiment 18 is the method of any one of embodiments 1-17, wherein the tiles are arranged in a linear array such that each tile is configured to provide data to only one or two neighboring tiles.

Embodiment 19 is a system comprising: one or more computers and one or more storage devices storing instructions that are operable, when executed by the one or more computers, to cause the one or more computers to perform the method of any one of claims 1 to 18.

Embodiment 20 is a computer storage medium encoded with a computer program, the program comprising instructions that are operable, when executed by data processing apparatus, to cause the data processing apparatus to perform the method of any one of embodiments 1 to 18.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A system comprising:
  one or more computers and one or more storage devices storing instructions that are operable, when executed by the one or more computers, to cause the one or more computers to perform operations comprising:
    receiving a representation of a dataflow graph comprising a plurality of nodes, wherein each node of the plurality of nodes represents respective matrix operations to be performed by a hardware integrated circuit comprising a plurality of synchronous tiles;
    generating a plurality of candidate allocations of respective portions of the dataflow graph to each synchronous tile of the plurality of synchronous tiles;
    evaluating each candidate allocation of the plurality of candidate allocations according to one or more resource constraints of the hardware integrated circuit;
    selecting a candidate allocation of the plurality of candidate allocations in response to evaluating each candidate allocation of the plurality of candidate allocations; and
    generating, based on the selected candidate allocation of the plurality of candidate allocations, hardware instructions for executing, at the hardware integrated circuit, a matrix operation represented by a node of the plurality of nodes of the dataflow graph.

2. The system of claim 1, wherein each synchronous tile of the plurality of synchronous tiles comprises a computational array of independent processing elements.

3. The system of claim 1, wherein generating the plurality of candidate allocations of respective portions of the dataflow graph comprises generating the plurality of candidate allocations according to a Static Random Access Memory (SRAM) constraint specifying that a size of weights for a neural network layer must not exceed a capacity of local SRAM that is local to a corresponding synchronous tile of the plurality of synchronous tiles.

4. The system of claim 3, wherein each local SRAM is a resident memory integrated into the corresponding synchronous tile of the plurality of synchronous tiles that will perform operations associated with the neural network layer.

5. The system of claim 1, wherein generating the plurality of candidate allocations of respective portions of the dataflow graph comprises allocating matrices of different respective layers to different respective tiles.

6. The system of claim 1, wherein generating the plurality of candidate allocations of respective portions of the dataflow graph comprises performing sublayer sharding on a matrix for a particular node in a program for execution at the hardware integrated circuit, including allocating different blocks of the matrix to different respective synchronous tiles of the plurality of synchronous tiles.

7. The system of claim 6, wherein allocating different blocks of the matrix to different respective synchronous tiles of the plurality of synchronous tiles comprises: i) splitting the matrix along a row; ii) splitting the matrix along a column; or iii) splitting the matrix diagonally.

8. The system of claim 7, wherein the operations further comprise performing sublayer sharding on any matrix that exceeds a size threshold.

9. The system of claim 1, wherein generating the plurality of candidate allocations of respective portions of the dataflow graph comprises performing parallelogram time slicing so that different passes having initially different execution slopes have execution slopes that are substantially the same.

10. The system of claim 9, wherein performing parallelogram time slicing comprises:
computing a respective execution slope for each pass of two different passes;
determining that a first pass has a smaller execution slope than a second pass; and
in response to the determining, modifying the candidate allocation so that the first pass has a shallower execution slope.

11. The system of claim 10, wherein modifying the candidate allocation comprises inserting buffering or stalls into the candidate allocation.

12. The system of claim 1, wherein generating the plurality of candidate allocations of respective portions of the dataflow graph comprises performing oversharding so that a node of the plurality of nodes of the dataflow graph that could be performed entirely by one synchronous tile of the plurality of synchronous tiles is split among multiple different synchronous tiles of the plurality of synchronous tiles.

13. The system of claim 12, wherein performing oversharding comprises assigning one respective layer to each synchronous tile of the plurality of synchronous tiles and splitting a last layer among all synchronous tiles of the plurality of synchronous tiles.

14. The system of claim 12, wherein performing oversharding comprises splitting a plurality of matrices across all synchronous tiles of the plurality of synchronous tiles.

15. The system of claim 1, wherein generating the plurality of candidate allocations of respective portions of the dataflow graph comprises performing zigzag sharding by pairing together different layers having differing memory and computational requirements.

16. The system of claim 15, wherein pairing together different layers comprises pairing a first layer with a last layer so that a same synchronous tile executes both the first layer and the last layer.

17. The system of claim 16, wherein the first layer has the greatest computational requirements and the last layer has the greatest memory requirements.

18. The system of claim 1, wherein the plurality of synchronous tiles are arranged in a linear array such that each synchronous tile of the plurality of synchronous tiles is configured to provide data to only one or two neighboring synchronous tiles of the plurality of synchronous tiles.

19. A computer-implemented method comprising:
receiving a representation of a dataflow graph comprising a plurality of nodes, wherein each node of the plurality of nodes represents respective matrix operations to be performed by a hardware integrated circuit comprising a plurality of synchronous tiles;
generating a plurality of candidate allocations of respective portions of the dataflow graph to each synchronous tile of the plurality of synchronous tiles;
evaluating each candidate allocation of the plurality of candidate allocations according to one or more resource constraints of the hardware integrated circuit;
selecting a candidate allocation of the plurality of candidate allocations in response to evaluating each candidate allocation of the plurality of candidate allocations; and
generating, based on the selected candidate allocation of the plurality of candidate allocations, hardware instructions for executing, at the hardware integrated circuit, a matrix operation represented by a node of the plurality of nodes of the dataflow graph.

20. A non-transitory computer storage medium encoded with a computer program, the computer program comprising instructions that are executable by a data processing apparatus to cause performance of operations comprising:
receiving a representation of a dataflow graph comprising a plurality of nodes, wherein each node of the plurality of nodes represents respective matrix operations to be performed by a hardware integrated circuit comprising a plurality of synchronous tiles;
generating a plurality of candidate allocations of respective portions of the dataflow graph to each synchronous tile of the plurality of synchronous tiles;
evaluating each candidate allocation of the plurality of candidate allocations according to one or more resource constraints of the hardware integrated circuit;
selecting a candidate allocation of the plurality of candidate allocations in response to evaluating each candidate allocation of the plurality of candidate allocations; and
generating, based on the selected candidate allocation of the plurality of candidate allocations, hardware instructions for executing, at the hardware integrated circuit, a matrix operation represented by a node of the plurality of nodes of the dataflow graph.

* * * * *